United States Patent
Liu et al.

(10) Patent No.: US 11,432,199 B2
(45) Date of Patent: Aug. 30, 2022

(54) RESOURCE UNITS FOR WIDE BAND TRANSMISSION IN A WIRELESS NETWORK

(71) Applicant: MediaTek Singapore Pte. Ltd., Solaris (SG)

(72) Inventors: Jianhan Liu, San Jose, CA (US); Shengquan Hu, San Jose, CA (US); Thomas Edward Pare, Jr., San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 58 days.

(21) Appl. No.: 16/878,285

(22) Filed: May 19, 2020

(65) Prior Publication Data
US 2020/0383003 A1    Dec. 3, 2020

Related U.S. Application Data

(60) Provisional application No. 62/855,011, filed on May 31, 2019.

(51) Int. Cl.
*H04W 28/20* (2009.01)
*H04W 76/11* (2018.01)
(Continued)

(52) U.S. Cl.
CPC ........... *H04W 28/20* (2013.01); *H04L 45/245* (2013.01); *H04W 72/0453* (2013.01); *H04W 76/11* (2018.02); *H04W 84/12* (2013.01)

(58) Field of Classification Search
CPC . H04W 28/20; H04W 76/11; H04W 72/0453; H04W 84/12; H04W 16/10;
(Continued)

(56) References Cited

U.S. PATENT DOCUMENTS

| 2016/0301452 A1 | 10/2016 | Kwon et al. |
| 2018/0184402 A1 | 6/2018 | Cariou et al. |

(Continued)

FOREIGN PATENT DOCUMENTS

| WO | 2016081378 A1 | 5/2016 |
| WO | 2019074953 A1 | 4/2019 |

OTHER PUBLICATIONS

IEEE: doc.: IEEE 802.11-19/0797r0, Title: 320MHz Channelization and Tone Plan; Author: Chen et al. May 2019 (Year: 2019).*
(Continued)

*Primary Examiner* — Hassan A Phillips
*Assistant Examiner* — Mohammed S Chowdhury (57) ABSTRACT

Embodiments of the present invention provide an apparatus and method for WLAN transmission over 320 MHz channels that use encoding and modulation schemes of existing 160 MHz tone plans defined in the IEEE 802.11ax standard. For example, 320 MHz transmissions on a contiguous 320 MHz channel or a non-contiguous 160 MHz+160 MHz channel can be performed using a 320 MHz PPDU, or a 160 MHz+160 MHz PPDU, and the 320 MHz/160 MHz+160 MHz PPDU can be defined using the 160 MHz tone plan according to the IEEE 802.11ax standard. The existing tone plan of the IEEE 802.11ax standard is modified as described herein according to embodiments of the present invention. According to some embodiment, the 160 MHz tone plan can be repurposed to support multi-link aggregation including 80 MHz+240 MHz transmission, or 160 MHz+160 MHz transmission using two or more links.

14 Claims, 10 Drawing Sheets

(51) Int. Cl.
*H04L 45/24* (2022.01)
*H04W 72/04* (2009.01)
*H04W 84/12* (2009.01)

(58) Field of Classification Search
CPC .. H04W 72/085; H04L 45/245; H04L 5/0041;
H04L 5/001; H04L 5/003
See application file for complete search history.

(56) References Cited

U.S. PATENT DOCUMENTS

| | | | |
|---|---|---|---|
| 2019/0109684 A1* | 4/2019 | Chen | H04W 52/367 |
| 2019/0150063 A1* | 5/2019 | Chu | H04W 48/12 |
| | | | 370/338 |
| 2019/0253296 A1* | 8/2019 | Chen | H04L 5/0076 |
| 2019/0289612 A1* | 9/2019 | Chen | H04L 5/0092 |
| 2020/0007265 A1* | 1/2020 | Min | H04L 1/0057 |

OTHER PUBLICATIONS

Samsung, Intel. "Beyond 802.11ax—Throughput Enhancement Utilizing Multi-bands across 2.4/5/6 GHz Bands", IEEE Submission, May 4, 2018.

* cited by examiner

RESOURCE UNITS FOR WIDE BAND TRANSMISSION IN A WIRELESS NETWORK

CROSS-REFERENCE TO RELATED APPLICATIONS

This application claims the benefit of and priority to provisional patent application Ser. No. 62/855,011, with filing date May 31, 2019, by Jianhan Liu, et al., which is hereby incorporated by reference in its entirety.

FIELD

Embodiments of the present invention generally relate to the field of wireless communications. More specifically, embodiments of the present invention relate to systems and methods for assigning resource units within a wireless communication network.

BACKGROUND

Existing approaches to WLAN wireless communication involve interleaved tone plans used to map complex constellation points of codewords to nonadjacent addresses or index values. Interleaving the codeword mapping is important to reduce the error rate of wireless transmissions, for example, those caused by burst errors. This type of mapping in effect spreads the data out over frequencies to make channel errors more correctable via error correction algorithms. Existing tone plans typically define resource units including a number of data tones ($N_{SD}$) that can be assigned to specific users/clients. The size of the channel's resource units depends on the channel's bandwidth and tone spacing. The bands currently available for 5 GHz transmissions are 20 MHz, 40 MHz, 80 MHz, and 160 MHz.

Recently, a new generation of wireless standards has been proposed that utilizes wider channel bandwidths or transmissions over wide bands (e.g., 320 MHz bands) using various configurations. However, reusing existing tone plans (e.g., 802.11ax) using normal resource units for 320 MHz bands is an inefficient solution because several tones (e.g., null tones) are unused, resulted in substantial wasted bandwidth.

SUMMARY

Accordingly, what is needed is an approach to wireless transmissions over 320 MHz wireless channels that reuses existing tone plans and repurposes wasted tones of the tone plans to enhance the spectral efficiency of the transmissions, for example, by performing signaling and data transmission using newly defined resource units (RUs). Embodiments of the present invention are directed toward systems and methods of communication to communication in a wireless network over a 320 MHz/160 MHz+160 MHz channel that improve throughput and efficiency of the wireless network by repurposing otherwise wasted tones of existing tone plans.

According to one embodiment, a method of transmitting data in a wireless network over a 320 MHz wireless channel is disclosed. The method includes defining a first new RU and a second new RU of a 320 MHz channel, where the 320 MHz channel includes: a first resource unit (RU); a second RU; a first set of null tones between the first RU and the second RU; a third RU; a fourth RU; and a second set of null tones between the third RU and the fourth RU, and the first new RU includes the first set of null tones, and the second new RU includes the second set of null tones, associating the first new RU with a first RU ID and associating the second new RU with a second RU ID, and transmitting a 320 MHz Physical layer Protocol Data Unit (PPDU) over the wireless network. The 320 MHz PPDU includes the first, second, third, and fourth RUs, the first and second new RUs, and the first and second new RU IDs.

According to some embodiments, the first, second, third, and fourth RUs further include 996+5 tones, and where the PPDUs are transmitted in a single user (SU) mode.

According to some embodiments, where the first, second, third, and fourth RUs include 994+7 tones, and where the PPDUs are transmitted in a multi user (MU) mode.

According to some embodiments, 320 MHz channel comprises a first 160 MHz segment and a second 160 MHz segment.

According to some embodiments, the first, second, third, and fourth RUs of the 320 MHz channel are defined according to an 802.11ax 160 MHz tone plan.

According to some embodiments, the first 160 MHz segment is transmitted over a first band and the second 160 MHz segment is transmitted over a second band.

According to some embodiments, the first band includes a 5 GHz band and the second band includes a 6 GHz band.

According to some embodiments, where the 320 MHz channel includes an 80 MHz segment and a 240 MHz segment, and the first RU and the second RU are transmitted using multi-link aggregation.

According to some embodiments, the 320 MHz channel includes a 160+160 MHz channel, and the PPDU includes a 160+160 MHz PPDU.

According to some embodiments, the first RU ID and the second RU ID are included in an EHT-SIGs field of the 320 MHz PPDU.

According to some embodiments, the first RU ID and the second RU ID are included in at least one of: a PHY header and a MAC header.

According to some embodiments, the first new RU and the second new RU include at least one of: data and control information.

According to some embodiments, first new RU and the second new RU further include a plurality of direct current (DC) tones, where the plurality of DC tones are between the second RU and the third RU.

According to another embodiment, a method of transmitting data in a wireless network over a 320 MHz wireless channel is disclosed. The method includes defining a first new RU and a second new RU of a 320 MHz channel, where the 320 MHz channel includes: a first resource unit (RU); a second RU; a first set of null tones between the first RU and the second RU; a third RU; a fourth RU; and a second set of null tones between the third RU and the fourth RU, and the first new RU includes the first set of null tones, and the second new RU includes the second set of null tones, associating the first new RU with a first RU ID and associating the second new RU with a second RU ID, and transmitting a 320 MHz PPDU over the wireless network, where the 320 MHz PPDU includes the first, second, third, and fourth RUs, the new RU, and the new RU ID.

According to a different embodiment, a wireless communication device is disclosed. The wireless communication device includes a processor, and a memory coupled to the processor and including instructions executed by the processor to perform a method of wireless communication over a 320 MHz channel in a wireless network. The method includes defining a new RU of a 320 MHz channel, wherein the 320 MHz channel comprises: a first resource unit (RU);

a second RU; a first set of null tones between the first RU and the second RU; a third RU; a fourth RU; and a second set of null tones between the third RU and the fourth RU, and wherein the new RU comprises the first set of null tones, the second set of null tones, and a set of direct current (DC) tones between the second RU and the third RU, associating the first new RU with a first RU ID and associating the second new RU with a second RU ID, and transmitting a 320 MHz PPDU over the wireless network. The 320 MHz PPDU includes the first, second, third, and fourth RUs, the first and second new RUs, and the first and second new RU IDs.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 8 and 9) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Novel Resource Units For Spectral Efficiency
Enhancement Over 320/160 MHz+160 MHz
Wireless Channel As used herein, the term "EHT" may refer generally to a recent generation of wireless communication (Wi-Fi) known as Extremely High Throughput (EHT) and is defined according to the IEEE 802.11be standards. The term station (STA) refers generally to an electronic device capable of sending and receiving data over Wi-Fi that is not operating as an access point (AP).

Embodiments of the present invention provide an apparatus and method for WLAN transmission over 320 MHz channels that use encoding and modulation schemes of existing 160 MHz tone plans defined in the IEEE 802.11ax standard. For example, 320 MHz transmissions on a contiguous 320 MHz channel or a non-contiguous 160 MHz+160 MHz channel can be performed using a 320 MHz PPDU, or a 160 MHz+160 MHz PPDU, and the 320 MHz/160 MHz+160 MHz PPDU can be defined using the 160 MHz tone plan according to the IEEE 802.11ax standard. The existing tone plan of the IEEE 802.11ax standard is modified as described herein according to embodiments of the present invention. According to some embodiments, the 160 MHz tone plan can be repurposed to support multi-link aggregation including 80+240 MHz transmission, or 160 MHz+160 MHz transmission using two or more links.

Figure 1:
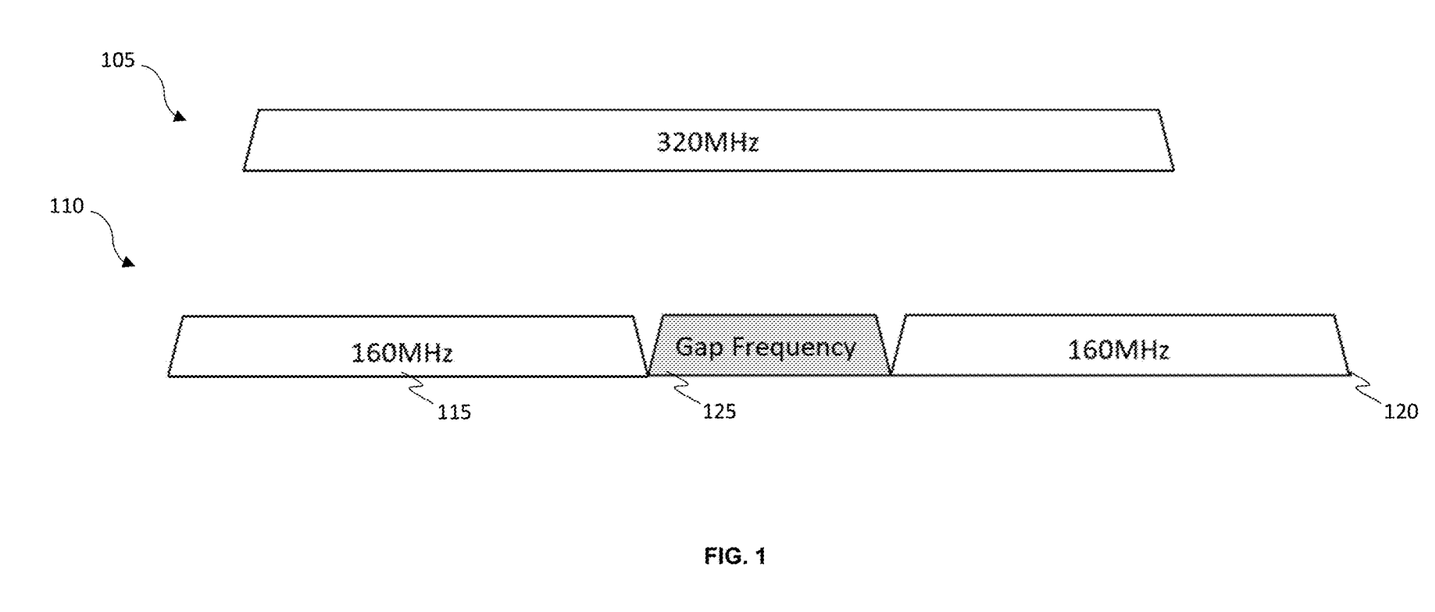
FIG. 1 is a block diagram of an exemplary contiguous 320 MHz wireless channel and an exemplary non-contiguous 160 MHz+160 MHz wireless channel.

FIG. 1 depicts an exemplary 320 MHz contiguous channel 105 and a non-contiguous 160 MHz+160 MHz channel 110 according to embodiments of the present invention. Each 160 MHz segment of the non-contiguous 160 MHz+160 MHz channel 110 can be transmitted over different bands, e.g., 160 MHz segment 115 can be transmitted over a 5 GHz band, and 160 MHz segment 120 can be transmitted over a 6 GHz, and the segments are separated by a gap frequency 125.

Figure 2:
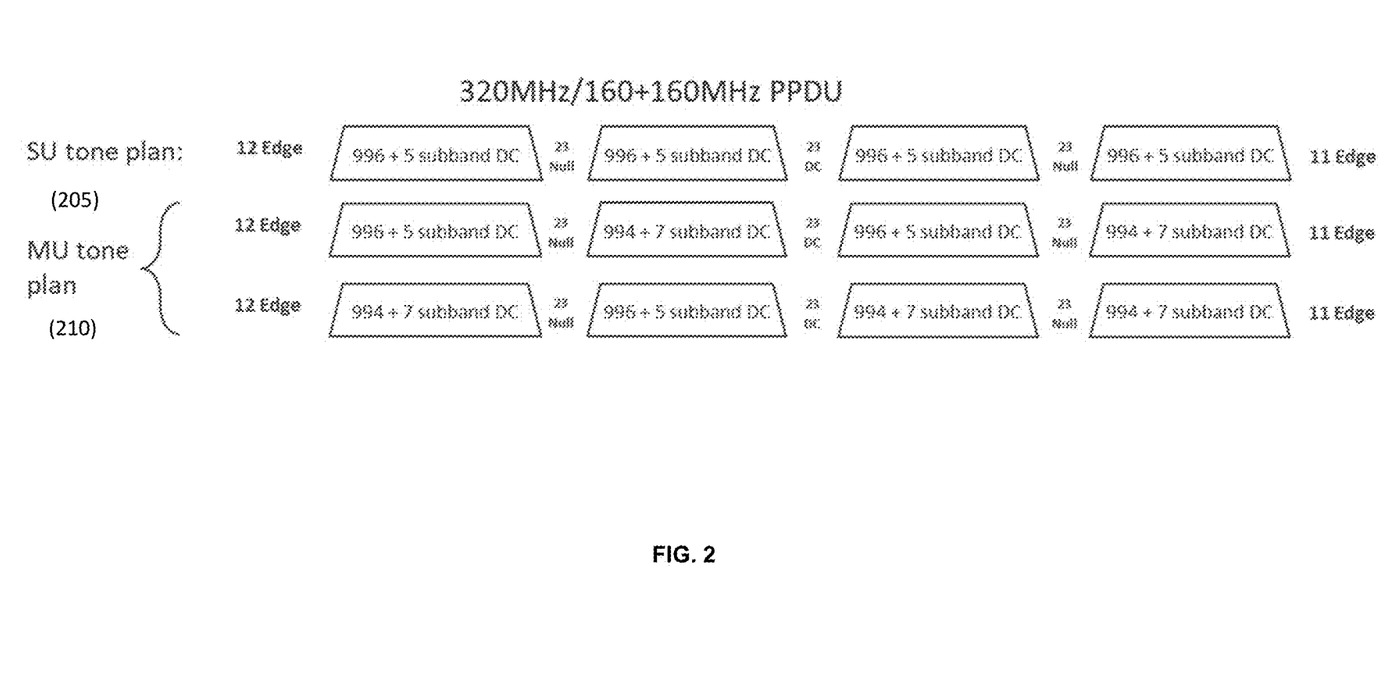
FIG. 2 is a block diagram of an exemplary single user (SU) tone plan and an exemplary multi-user (MU) tone plan for transmission over a 320 MHz/160+160 MHz wireless channel.

With regard to FIG. 2, exemplary single user (SU) tone plan 205 and multi-user (MU) tone plan 210 for transmission over a 320 MHz/160+160 MHz wireless channel are depicted according to embodiments of the present invention. The tone plans can be used to transmit data in a MIMO wireless network, for example. The 320 MHz/160 MHz+160 MHz PPDUs in tone plans 205 and 210 reuse the 160 MHz tone plan defined in the IEEE 802.11ax standard using 996+5 tone and 994+7 tone blocks (resource units). Each 996-tone RU includes a 5-tone sub-band direct current (DC) ("996+5"), and each 994-tone RU includes a 7-tone sub-band DC ("994+7"). The blocks can be defined according to the 80 MHz tone plan in IEEE 802.11ax. For MU-MIMO using MU tone plan 210, the available bandwidth is divided into multiple streams (e.g., 2-4 streams) that share the bandwidth, and beamforming is used to direct signals to intended wireless devices to improve throughput of the wireless network. As depicted in FIG. 2, MU-MIMO performed using MU tone plan 210 uses two concurrent streams.

Figure 3:
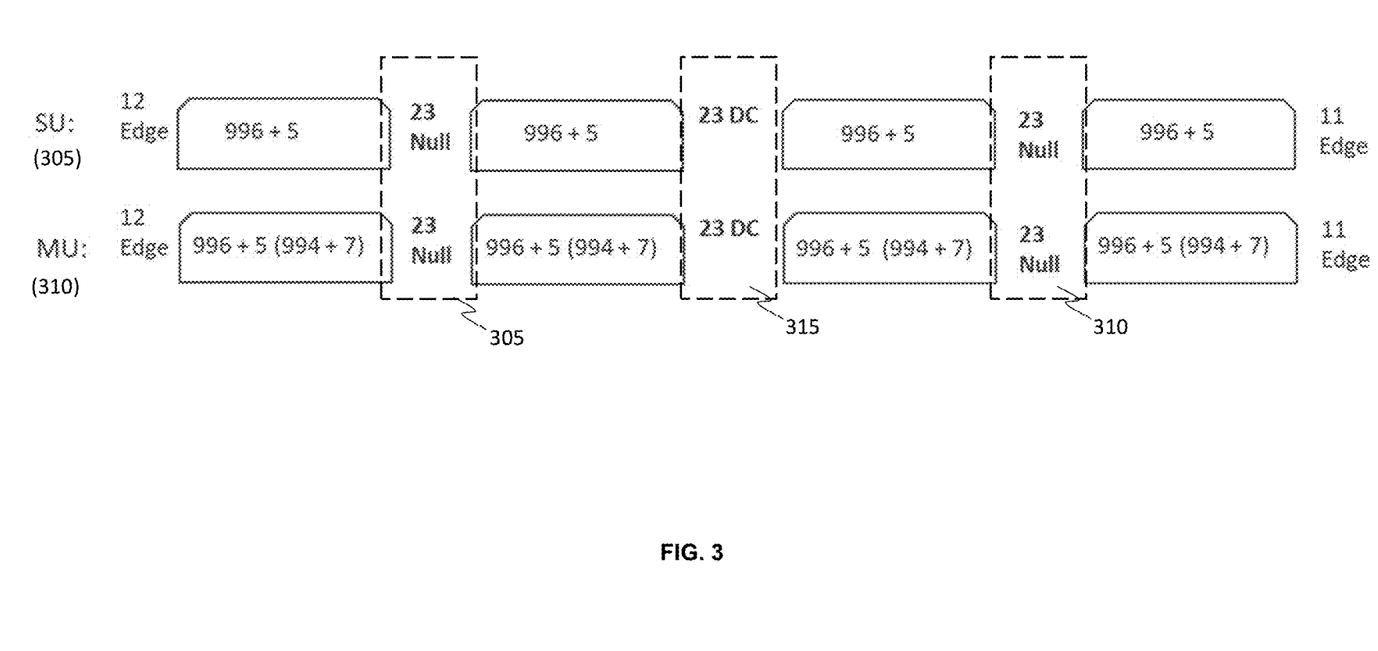
FIG. 3 is a block diagram of unused bandwidth/tones of an exemplary SU tone plan and an exemplary multi-user MU tone plan.

As depicted in FIG. 3, the tone plans 305 and 310 define edge and null tones that are not used to carry data according to the existing IEEE 802.11ax tone plan. The 12 edge tones preceding a PPDU and the 11 edge tones following the PPDU are used as guard bands to pad/buffer adjacent transmissions. The null tones (subcarriers) 305 and 310 between resource units are not used for any purpose, and the direct current/center frequency adjacent (DC) tones 315 are often unused as well. In total, more than 46 tones are potentially unused representing more than 3.5 MHz in wasted bandwidth. Accordingly, embodiments of the present invention modify the existing tone plan in IEEE 802.11ax to use null tones 305 and 310 and/or DC tones 315 to advantageously increase spectral efficiency when transmitting 320 MHz/160 MHz+160 MHz PPDUs. Specifically, embodiments of the present invention define new RUs that include these wasted tones. The new RUs are assigned unique RU identifiers so that the new RUs can be signaled in PHY headers or MAC headers and used for data transmission and/or control information transmissions.

Figure 4:
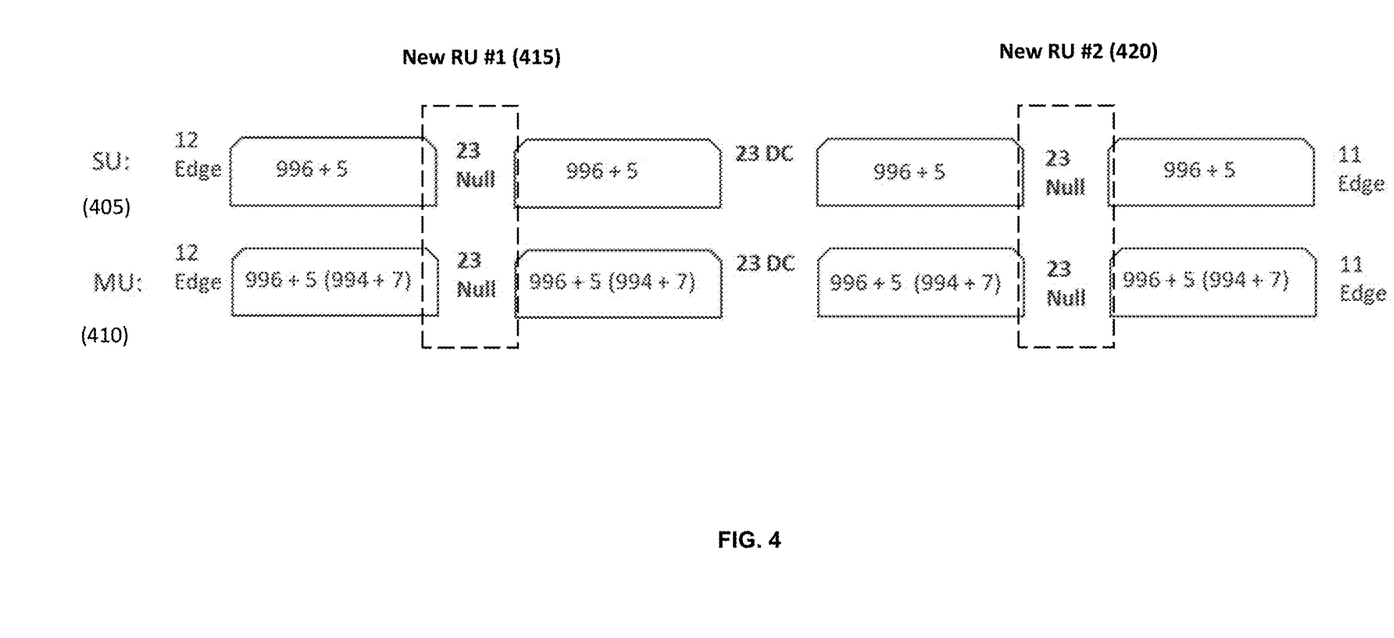
FIG. 4 is a block diagram of exemplary newly defined resource units including null tones for transmitting data over a 320 MHz/160+160 MHz wireless channel depicted according to embodiments of the present invention.

With regard to FIG. 4, exemplary 320 MHz/160 MHz+160 MHz tone plans 405 (SU) and 410 (MU) defining non-continuous resource units 415 and 420 that include null tones unused in existing IEEE 802.11ax 160 MHz tones plans are depicted according to embodiments of the present invention. RUs 415 and 420 include the 23 null tones in the middle of each 160 MHz frequency segment. For example, RU 415 includes the 23 null tones in the middle of left 160 MHz segment, and the RU 420 includes the 23 null tones in the middle of the right 160 MHz segment. The size of the RUs 415 and 420 is configurable but can be no more than 23 tones. For example, according to some embodiments, the size of the RUs 415 and 420 is 23 tones to maximize the spectral efficiency. According to other embodiments, the size of the RUs 415 and 420 is 33 tones so that the encoding and interleaving methods defined for 802.11ax dual carrier modulation (DCM) can be used directly.

Figure 5:
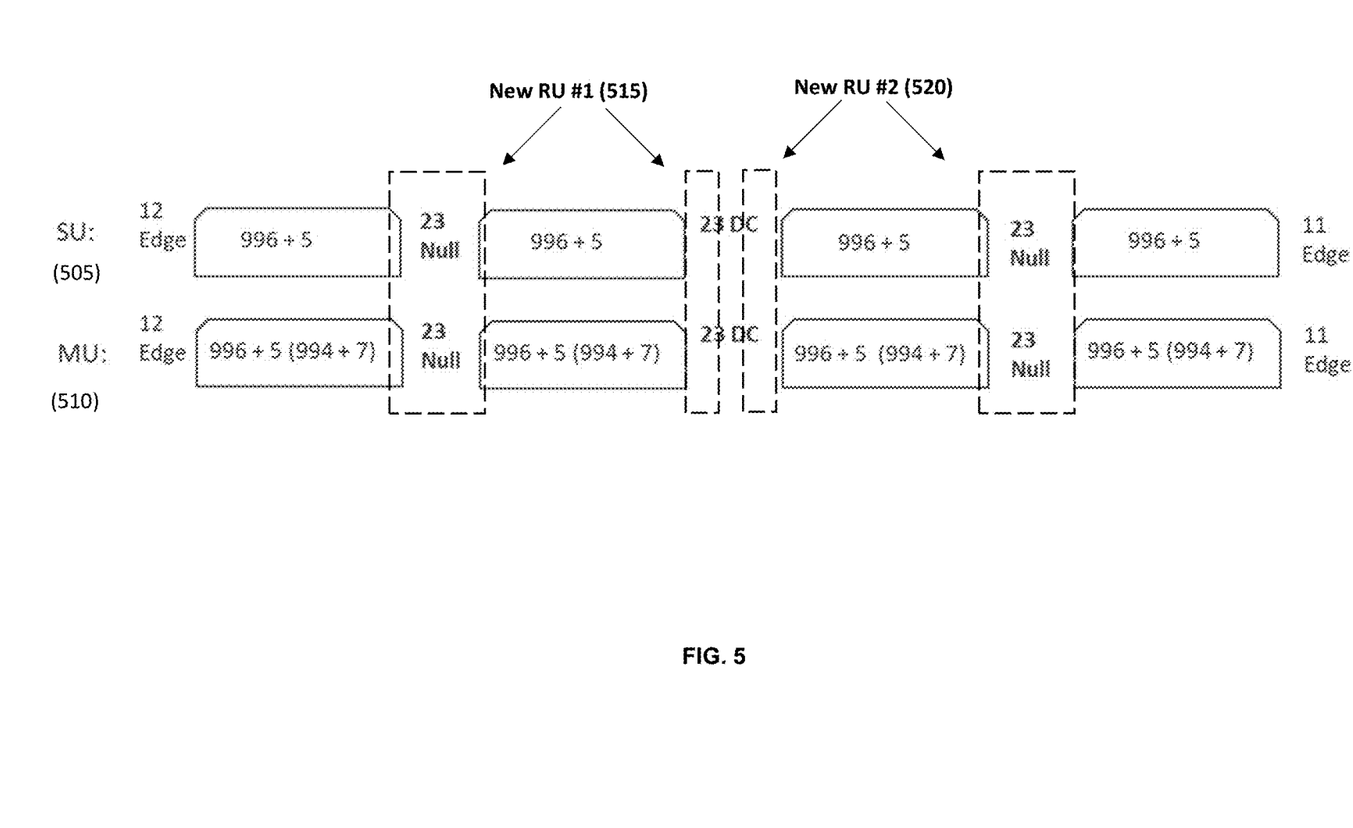
FIG. 5 is a block diagram of exemplary newly defined resource units including null tones and direct current (DC) tones for transmitting data over a 320 MHz/160+160 MHz wireless channel depicted according to embodiments of the present invention.

With regard to FIG. 5, exemplary 320 MHz/160 MHz+160 MHz tone plans 505 (SU) and 510 (MU) defining non-continuous resource units 515 and 520 that include null tones unused in existing IEEE 802.11ax 160 MHz tones plans are depicted according to embodiments of the present invention. RUs 515 and 520 include the 23 null tones in the middle of each 160 MHz frequency segment and some of the DC tones between 160 MHz segments. For example, RU 515 includes the 23 null tones in the middle of left and some of the DC tones, and the RU 520 includes the 23 null tones in the middle of the right 160 MHz segment and some of the DC tones. The size of the RUs 515 and 520 is configurable but can be no more than 31 tones (e.g., 23 null tones and 8 DC tones). According to some embodiments, the size of the RUs 515 and 520 is 26 tones as defined in IEEE 802.11ax, and the encoding and modulation schemes defined in IEEE 802.11ax can be re-used.

Figure 6:
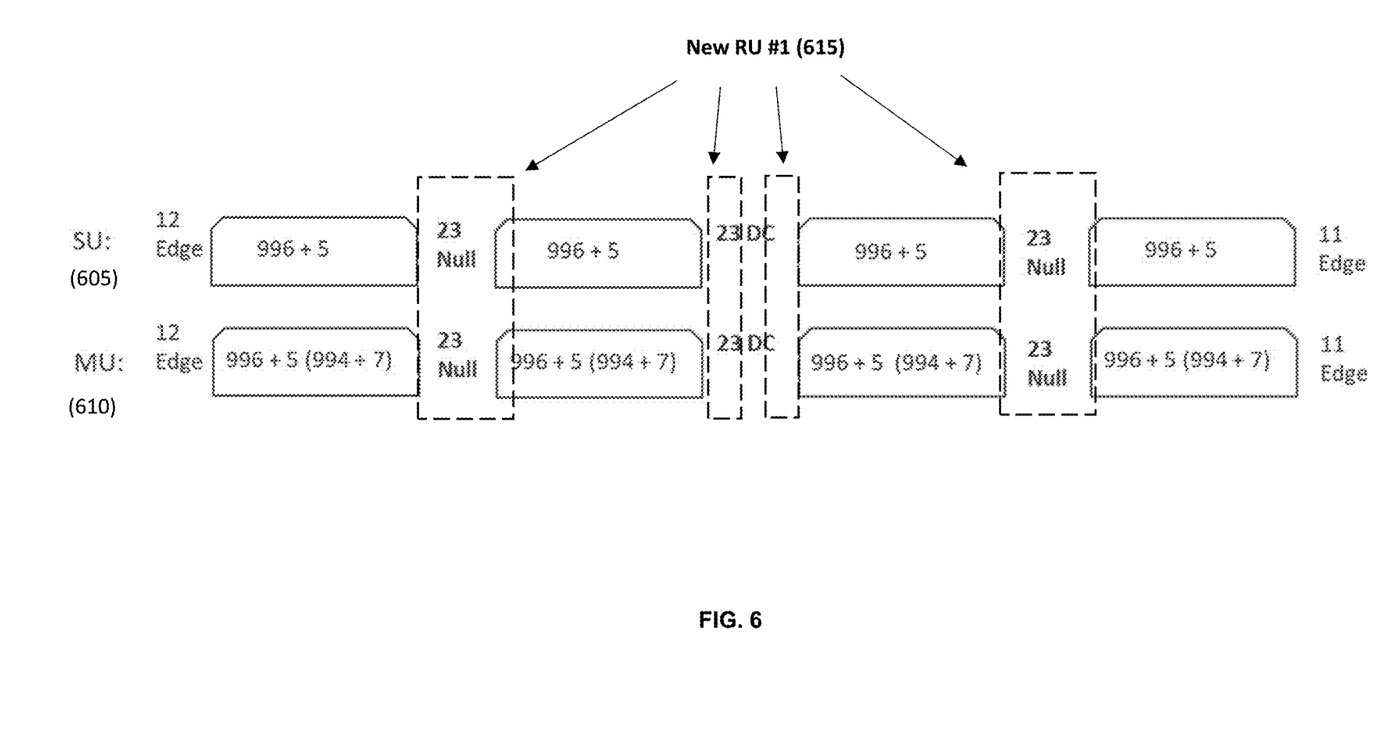
FIG. 6 is a block diagram of an exemplary newly defined resource unit that includes direct current (DC) tones and two sets of null tones for transmitting data over a 320 MHz/160+160 MHz wireless channel depicted according to embodiments of the present invention.

With regard to FIG. 6, exemplary 320 MHz/160 MHz+160 MHz tone plans 605 (SU) and 610 (MU) defining non-continuous resource unit 615 that include null tones unused in existing IEEE 802.11ax 160 MHz tones plans are depicted according to embodiments of the present invention. RU 615 can include the 23 null tones in the middle of each 160 MHz frequency segment and some of the DC tones between the 160 MHz segments. The size of the RU 615 is configurable but can be no more than 63 tones. For example, RU 615 can be a 52-tone RU as defined in IEEE 802.11ax, and the encoding and modulation schemes defined in IEEE 802.11ax can be re-used. According to some embodiments, some DC tones are shifted to the middle of the spectrum and other DC tones are assigned to RU 615.

Figure 7:
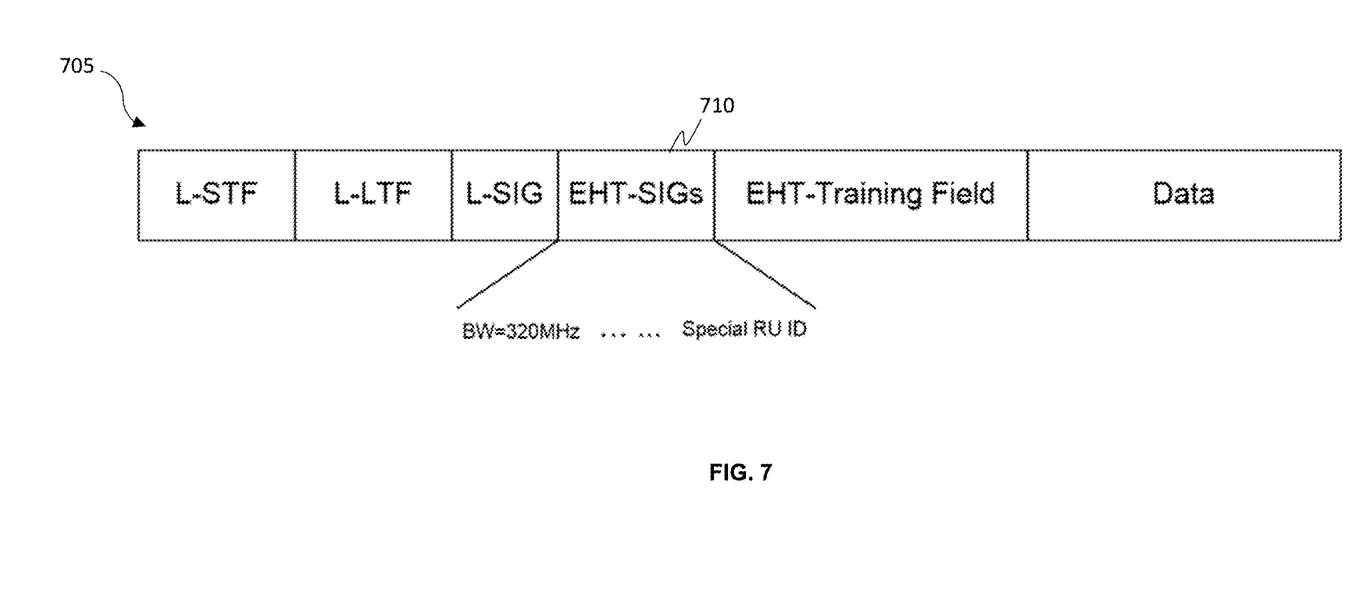
FIG. 7 is an exemplary PPDU for signaling and transmitting data over a 320 MHz/160+160 MHz wireless channel depicted according to embodiments of the present invention.

With regard to FIG. 7, an exemplary 320 MHz/160 MHz+160 MHz PPDU 705 for signaling and transmitting resource units of a 320 MHz/160 MHz+160 MHz tone plan is depicted according to embodiments of the present invention. The 320 MHz/160 MHz+160 MHz PPDU 705 can be used by a wireless station (STA) to indicate if the wireless STA can support the transmission and/or reception of new resource units defined herein according to embodiments of the present invention. Specifically, the EHT-SIGs field 710 can be used to indicate the supported bandwidth (e.g., 320 MHz) and the identifier associated with new RUs defined herein according to embodiments of the present invention.

Figure 8:
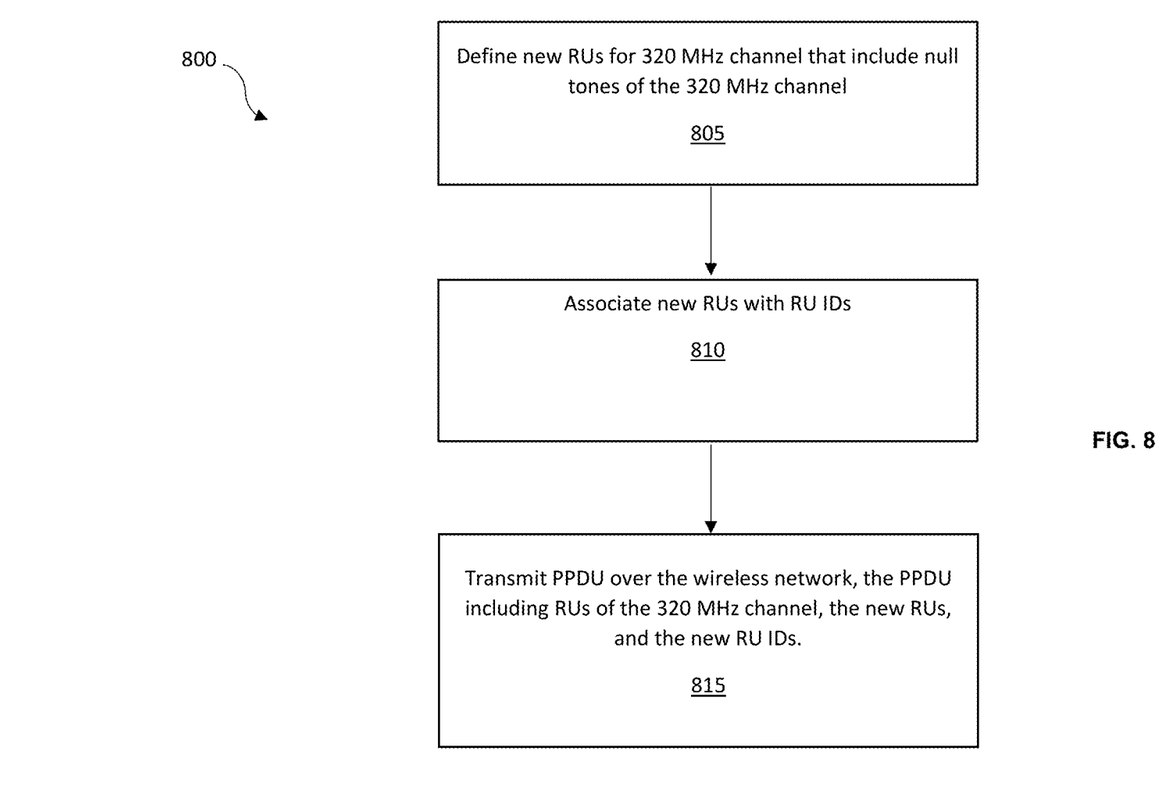
FIG. 8 is a flow chart of an exemplary sequence of computer implemented steps for automatically transmitting data in a wireless network over a 320 MHz wireless channel depicted according to embodiments of the present invention.

With regard to FIG. 8, a flow chart of an exemplary sequence of computer implemented steps 800 for automatically transmitting data in a wireless network over a 320 MHz wireless channel is depicted according to embodiments of the present invention. The 320 MHz wireless channel includes a first RU, a second RU, a first set of null tones between the first RU and the second RU, a third RU, a fourth RU, and a second set of null tones between the third RU and the fourth RU.

At step 805, new RUs are defined for the 320 MHz channel that include either the first set of null tones or the second set of null tones. For example, a first RU can be defined that includes the first set of null tones, and a second RU can be defined that includes the second set of null tones.

At step 810, the new RUs are associated with RU IDs.

At step 815, a PPDU is transmitted over the wireless network. The PPDU includes the first, second, third, and fourth RUs, the new RUs, and the new RU IDs. The PPDU can be a 320 MHz PPDU or a 160 MHz+160 MHz PPDU. The new RUs can carry data or control information, for example.

Figure 9:
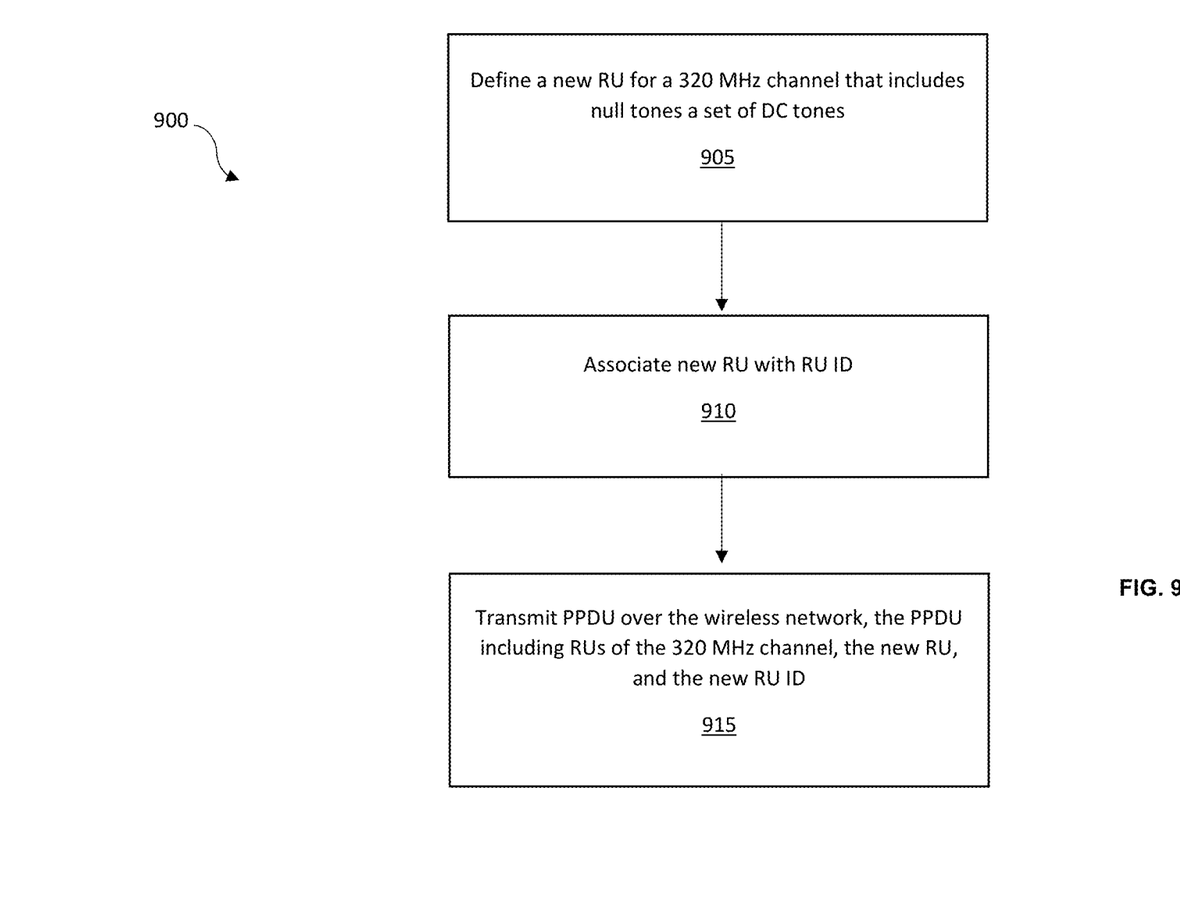
FIG. 9 is a flow chart of an exemplary sequence of computer implemented steps for automatically transmitting data in a wireless network over a 320 MHz wireless channel depicted according to embodiments of the present invention.

With regard to FIG. 9, a flow chart of an exemplary sequence of computer implemented steps 900 for automatically transmitting data in a wireless network over a 320 MHz wireless channel is depicted according to embodiments of the present invention.

At step 905, a new RU is defined for the 320 MHz channel that include the first set of null tones, the second set of null tones, and a set of direct current (DC) tones between the second RU and the third RU.

At step 910, new RU is associated with a RU ID.

At step 915, a PPDU is transmitted over the wireless network. The PPDU includes the first, second, third, and fourth RUs, the new RU, and the new RU ID. The PPDU can be a 160 MHz+160 MHz PPDU. The new RUs can carry data or control information, for example.

Exemplary Computer Controlled System

Figure 10:
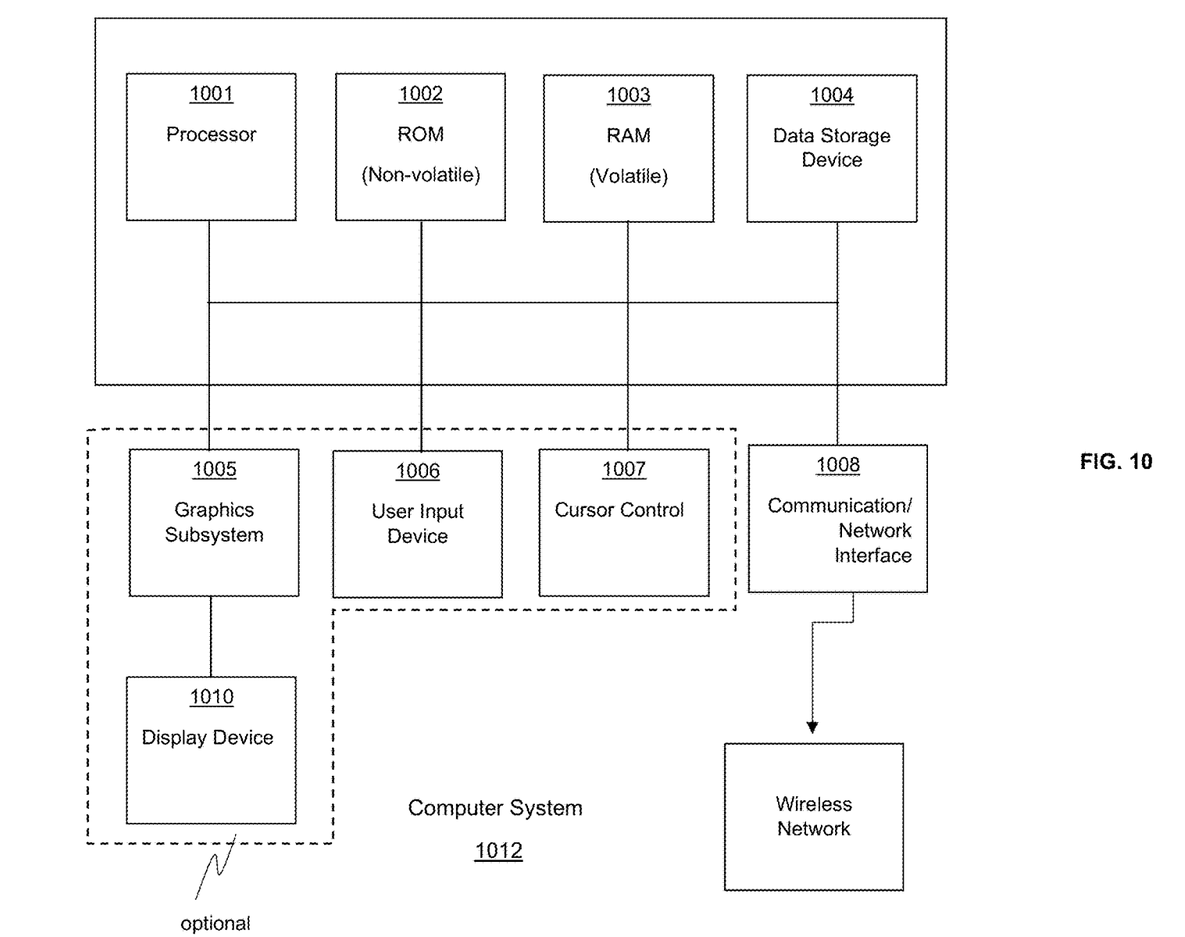
FIG. 10 is a block diagram depicting an exemplary computer system platform upon which embodiments of the present invention may be implemented.

Embodiments of the present invention are drawn to electronic systems for transmitting data over a 320 MHz wireless channel (e.g., 320 MHz contiguous, 160 MHz+160 MHz, 80 MHz+240 MHz, etc.) using newly defined resource units. The following discussion describes one such exemplary electronic system or computer system that can be used as a platform for implementing embodiments of the present invention. The exemplary computer system 1012 can be a wireless access point or a wireless station, for example.

In the example of FIG. 10, the exemplary computer system or wireless device includes a central processing unit (such as a processor or a CPU) 1001 for running software applications and optionally an operating system. Read-only memory 1002 and random access memory 1003 store applications and data for use by the CPU 1001. Data storage device 1004 provides non-volatile storage for applications and data and may include fixed disk drives, removable disk drives, flash memory devices, and CD-ROM, DVD-ROM or other optical storage devices. The optional user inputs 1006 and 1007 comprise devices that communicate inputs from one or more users to the computer system 1012 (e.g., mice, joysticks, cameras, touch screens, and/or microphones).

A communication or network interface 1008 includes a plurality of transceivers and allows the computer system 1012 to communicate with other computer systems, networks, or devices via an electronic communications network, including wired and/or wireless communication and including an Intranet or the Internet (e.g., 802.11 wireless standard). According to embodiments of the present invention, the communication or network interface 1008 can operate multiple transceivers simultaneously. The communication or network interface 1008 can further include a cooperative management unit for coordinating the data sent and/or received by the transceivers. The communication or network interface 1008 and can include a dual band interface that can operate in multiple bands simultaneously, such as 2.4 GHz, 5 GHz, and/or 6 GHz. Moreover, the network interface 1008 can be configured to transmit data over a 320 MHz/160 MHz+160 MHz wireless channel using new resource units defined to improve network throughput by using null and/or DC tones that were previously unused.

The optional display device 1010 may be any device capable of displaying visual information in response to a signal from the computer system 1012 and may include a flat panel touch sensitive display, for example, and may be remotely disposed. The components of the computer system 1012, including the CPU 1001, memory 1002/1003, data storage 1004, user input devices 1006, and optional graphics subsystem 1005 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of transmitting data in a wireless network over a 320 MHz channel in the wireless network, the method comprising:
    defining a first new RU and a second new RU of the 320 MHz channel, wherein the 320 MHz channel comprises: a first resource unit (RU); a second RU; a first set of null tones between the first RU and the second RU; a third RU; a fourth RU; and a second set of null tones between the third RU and the fourth RU, wherein the first new RU comprises the first set of null tones, and wherein the second new RU comprises the second set of null tones;
    associating the first new RU with a first RU ID and associating the second new RU with a second RU ID; and
    transmitting a PPDU over the wireless network, wherein the PPDU comprises:
        the first, the second, the third, and the fourth RUs;
        the first and the second new RUs; and
        the first and the second new RU IDs.

2. The method described in claim 1, wherein the first, the second, the third, and the fourth RUs comprise 996+5 tones, and wherein the transmitting comprises transmitting the PPDU in a single user (SU) mode.

3. The method described in claim 1, wherein the first, the second, the third, and the fourth RUs comprise 994+7 tones, and wherein the transmitting comprises transmitting the PPDU in a multi user (MU) mode.

4. The method described in claim 1, wherein the 320 MHz channel comprises a first 160 MHz segment and a second 160 MHz segment.

5. The method described in claim 1, wherein the first, the second, the third, and the fourth RUs of the 320 MHz channel are defined according to an 802.11ax 160 MHz tone plan.

6. The method described in claim 4, wherein the transmitting comprises transmitting the first 160 MHz segment over a first band and transmitting the second 160 MHz segment over a second band.

7. The method described in claim 6, wherein the first band comprises a 5 GHz band and the second band comprises a 6 GHz band.

8. The method described in claim 1, wherein the 320 MHz channel comprises an 80 MHz segment and a 240 MHz segment, and wherein the transmitting comprises transmitting the first RU and the second RU using multi-link aggregation.

9. The method described in claim 1, wherein the 320 MHz channel comprises a 160+160 MHz channel, and wherein the PPDU comprises a 160+160 MHz PPDU.

10. The method described in claim 1, wherein the first RU ID and the second RU ID are included in an EHT-SIGs field of the PPDU, and the PPDU comprises a 320 MHz PPDU.

11. The method described in claim 1, wherein the first RU ID and the second RU ID are included in at least one of: a PHY header and a MAC header.

12. The method described in claim 1, wherein the first new RU and the second new RU comprise at least one of: data and control information.

13. The method described in claim 1, wherein the first new RU and the second new RU further comprise a set of direct current (DC) tones between the second RU and the third RU.

14. A wireless communication device, comprising:
a processor; and
a memory coupled to the processor and comprising instructions executed by the processor to perform a method of wireless communication over a 320 MHz channel in a wireless network, the method comprising:
defining a first new RU and a second new RU of the 320 MHz channel, wherein the 320 MHz channel comprises: a first resource unit (RU); a second RU; a first set of null tones between the first RU and the second RU; a third RU; a fourth RU; and a second set of null tones between the third RU and the fourth RU, and wherein the first new RU comprises the first set of null tones, and wherein the second new RU comprises the second set of null tones;
associating the first new RU with a first RU ID and associating the second new RU with a second RU ID; and
transmitting a PPDU over the wireless network, wherein the PPDU comprises:
the first, the second, the third, and the fourth RUs;
the first and the second new RUs; and
the first and the second new RU IDs.

* * * * *